(12) United States Patent
Anandakumar et al.

(10) Patent No.: US 10,050,710 B2
(45) Date of Patent: Aug. 14, 2018

(54) TRANSMIT OPTICAL SUB-ASSEMBLY WITH LOCAL FEEDBACK

(71) Applicant: Maxlinear, Inc., Carlsbad, CA (US)

(72) Inventors: Anand Anandakumar, Carlsbad, CA (US); Ioannis Spyropoulos, Carlsbad, CA (US); Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

(21) Appl. No.: 15/164,534

(22) Filed: May 25, 2016

(65) Prior Publication Data
US 2016/0352427 A1   Dec. 1, 2016

Related U.S. Application Data

(60) Provisional application No. 62/166,220, filed on May 26, 2015.

(51) Int. Cl.
*H04B 10/04* (2006.01)
*H04B 10/12* (2006.01)
*H04B 10/2507* (2013.01)
*H04B 10/079* (2013.01)
*H04B 10/58* (2013.01)
(Continued)

(52) U.S. Cl.
CPC ..... *H04B 10/2507* (2013.01); *H04B 10/0795* (2013.01); *H04B 10/0799* (2013.01); *H04B 10/40* (2013.01); *H04B 10/58* (2013.01); *H04B 10/564* (2013.01)

(58) Field of Classification Search
None
See application file for complete search history.

(56) References Cited

U.S. PATENT DOCUMENTS 5,077,619 A * 12/1991 Toms ................... H04B 10/504
398/159
5,424,680 A * 6/1995 Nazarathy ............. H03F 1/3252
327/133

(Continued)

OTHER PUBLICATIONS

Profile, Basic Notes Laser Diodes, 2000, Profile Inc.*
Medhi, Von Neumann Architecture, http://www2.cs.siu.edu/~cs401/Textbook/ch2.pdf, 2012.*

*Primary Examiner* — Ken N Vanderpuye
*Assistant Examiner* — Jai Lee
(74) *Attorney, Agent, or Firm* — McAndrews, Held & Malloy, Ltd.

(57) ABSTRACT

Aspects of a method and system for feedback during optical communications are provided. In one embodiment, a system for optical communications comprises a digital-to-analog converter (DAC), a driver, and a transmit optical subsystem. The DAC is operable to receive a digital code of a plurality of digital codes and output an analog current signal having an analog current level of a plurality of analog current levels. The driver is operable to condition the analog current signal output from the digital-to-analog converter. The transmit optical subsystem is operable to generate an optical signal from the conditioned analog current signal. A digital modification of an input digital signal is dynamically controlled by a feedback path according to one or more characteristics of the optical signal. The one or more characteristics comprise a nonlinearity that may be temperature dependent.

19 Claims, 4 Drawing Sheets

(51) Int. Cl.
*H04B 10/40* (2013.01)
*H04B 10/564* (2013.01)

(56) References Cited

U.S. PATENT DOCUMENTS

| | | | | |
|---|---|---|---|---|
| 5,798,854 A * | 8/1998 | Blauvelt | ............... | H03F 1/3252 327/362 |
| 6,178,026 B1 * | 1/2001 | Yoshida | ............. | H04B 10/2507 398/161 |
| 7,149,430 B2 * | 12/2006 | Hosking | ............ | H04B 10/0799 398/137 |
| 7,197,252 B2 * | 3/2007 | Oomori | ............ | H04B 10/25137 398/192 |
| 7,215,891 B1 * | 5/2007 | Chiang | .................. | H04B 10/40 398/137 |
| 7,321,734 B2 * | 1/2008 | Roberts | ............ | H04B 10/25137 398/159 |
| 7,412,174 B2 * | 8/2008 | Iannelli | ................ | H04B 10/503 398/159 |
| 8,041,226 B2 * | 10/2011 | Kato | ...................... | H04B 10/40 375/232 |
| 2005/0219089 A1 * | 10/2005 | Batruni | ..................... | H03F 1/32 341/118 |
| 2005/0249508 A1 * | 11/2005 | Volz | ................... | H01S 5/06804 398/195 |
| 2008/0279566 A1 * | 11/2008 | Miller | ................ | H04B 10/0799 398/162 |
| 2011/0280582 A1 * | 11/2011 | Piehler | ............ | H04B 10/25751 398/117 |
| 2014/0211882 A1 * | 7/2014 | Zhao | ..................... | H04L 27/368 375/296 |
| 2016/0308619 A1 * | 10/2016 | Ling | .................... | H04B 10/564 |

* cited by examiner

TRANSMIT OPTICAL SUB-ASSEMBLY WITH LOCAL FEEDBACK

CROSS REFERENCE TO RELATED APPLICATIONS

This application claims priority to U.S. provisional patent application Ser. No. 62/166,220, filed May 25, 2015, which is incorporated herein by reference in its entirety.

BACKGROUND

Limitations and disadvantages of conventional and traditional approaches to optical communications will become apparent to one of skill in the art, through comparison of such systems with some aspects of the present invention as set forth in the remainder of the present application with reference to the drawings.

BRIEF SUMMARY OF THE INVENTION

Systems and methods are provided for a transmit optical sub-assembly with local feedback, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
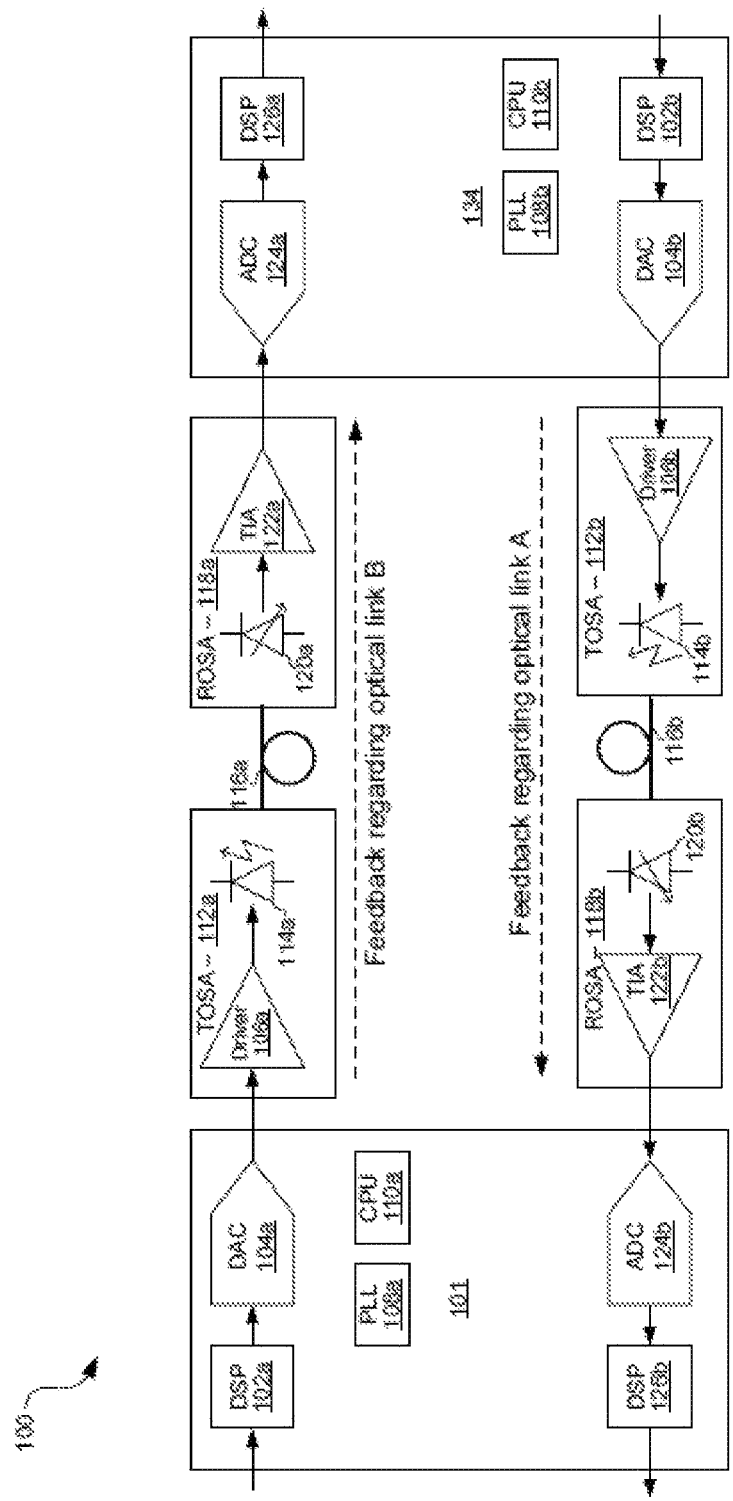
FIG. 1A shows a first example closed-loop optical communication system in accordance with aspects of this disclosure.

FIG. 1A shows a first example closed-loop optical communication system in accordance with aspects of this disclosure. The system 100 comprises an transmit and receive electrical subsystems 101 and 134, transmit optical sub-assemblies (TOSAs) 112a and 112b, receive optical sub-assemblies (ROSAs) 118a and 118b, and optical fibers 116a and 116b.

Each of the subsystems 101 and 134 comprises a transmit digital signal processing circuit 102, a receive digital signal processing circuit 126, a digital-to-analog converter (DAC) 104, an analog-to-digital converter (ADC) 124, a PLL 108, and a CPU 110 (where the different instances of each component are labeled 'a' and 'b', respectively). Each TOSA 112 comprises a laser diode driver 106, and a laser diode 114. Each ROSA 118 comprises a photodiode 120, and a transimpedance amplifier 122. The TOSA 112a, optical fiber 116a, and ROSA 118a are collectively referred to as 'optical link A" and TOSA 112b, optical fiber 116b, and ROSA 118b are collectively referred to as "optical link B."

Each of the CPUs 110a and 110b is operable to manage operations of a respective one the electrical subsystems 101 and 134. Such management may comprise, for example, each of the CPUs 110a and 110b receiving feedback via a respective one of the optical links and configuring its DSP 102, DSP 126, DAC 104, and ADC 124 based on the received feedback. Each of the CPUs 110 may also generate a feedback signals based on output of its respective DSP 126.

Each PLL 108 is operable to generate one or more timing signals such as sample clocks for the DAC 104 and ADC 124.

Each DSP 102 is operable to receive one or more streams of data and process the data to generate a signal suitable for directly modulating a respective one of the TOSs 112.

Each DAC 104 is operable to convert the digital signal output by a respective one of DSPs 102 to generate an analog waveform. Example configuration and operation of the DACs 104 is described below with reference to FIGS. 3C and 4.

Each driver 106 is operable to suitably condition the output of DAC 104a for application to a respective one of laser diodes 114.

Each laser diode 114 may comprise a semiconductor laser that is operable to generate a light beam having an intensity that is proportional to the current output by its respective driver 106 and at a wavelength that coincides with a minimum of dispersion in the optical fiber. The laser may be modulated with a data signal to be communicated via the optical fiber, where bandwidth limitations are reduced due to low dispersion and attenuation. The input current to output optical power of a typical laser diode may be highly nonlinear and vary greatly over temperature. Methods and systems for dealing with such nonlinearity and temperature dependence are further discussed below.

Each photodiode 120 is operable generate an output current proportional to the intensity of light incident on it.

Each transimpedance amplifier 122 is operable to convert the current output by a respective photodiode 120 to a voltage with a suitable range for input to a respective one of the ADCs 124.

Each ADC 124 is operable to convert the analog voltage present at its input to a corresponding digital value.

Each DSP 126 is operable to perform various operations on the received signal output by its respective ADC 124. Each DSP 126 may be operable to analyze a received signal to determine various characteristics of the optical link over which it was received. Such characteristics may include, for example: a nonlinearity of the optical link (e.g., coefficients of a Volterra series that models the link) and a temperature of the laser diode 114a of the optical link. The nonlinearity may be determined by, for example, comparing received signals (e.g., pilots or decoded data) with expected signals. The temperature may be indirectly determined based on known behavior of the optical components over temperature and/or determined directly from a temperature measurement reported by the optical components (e.g., on a control or "out-of-band" channel). One or more characteristics of the optical signal may comprise a temperature that is determined according to a plurality of Volterra series coefficients and a comparison between the optical signal and an expected signal.

Figure 1B:
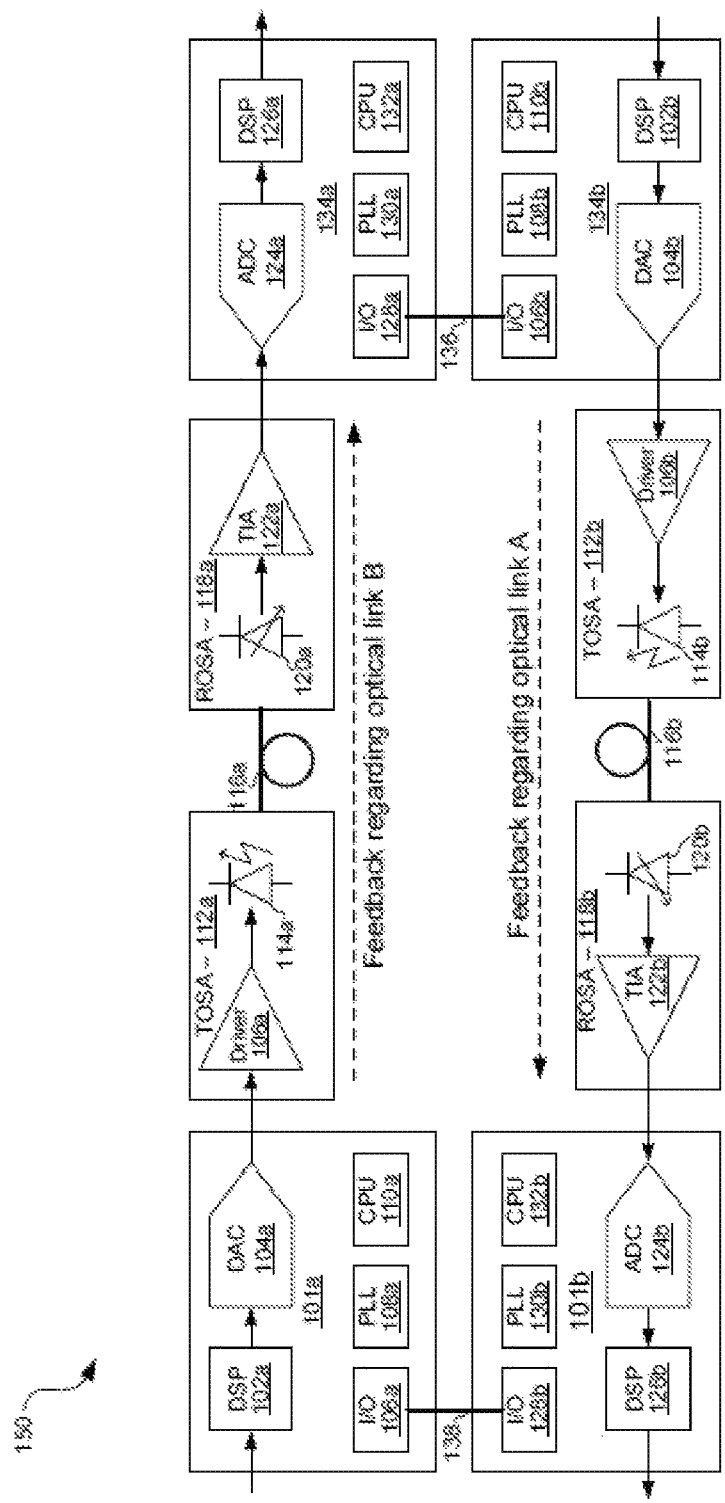
FIG. 1B shows a second example closed-loop optical communication system in accordance with aspects of this disclosure.

FIG. 1B shows a second example closed-loop optical communication system in accordance with aspects of this disclosure. The system 150 of FIG. 1B is similar to the system 100 of FIG. 1A except that electrical subsystem 101 is replaced by two discrete electrical subsystems 101*a* and 101*b* and electrical subsystem 134 is replaced by two discrete electrical subsystems 134*a* and 134*b*. In order to facilitate the feedback of the characteristics of the optical links, the electrical subsystems 101*a* and 101*b* comprise interface circuits 106*a* and 106*b* which are connected to each other via connection 138 and via which feedback about optical link A, received via optical link B, can be communicated to CPU 110*a* and used for configuring electrical subsystem 101*a*. Similarly, the electrical subsystems 134*a* and 134*b* comprise interface circuits 128*a* and 128*b* which are connected to each other via connection 136 and via which feedback about optical link B, received via optical link A, can be communicated to CPU 110*b* and used for configuring electrical subsystem 134*b*.

Figure 1C:
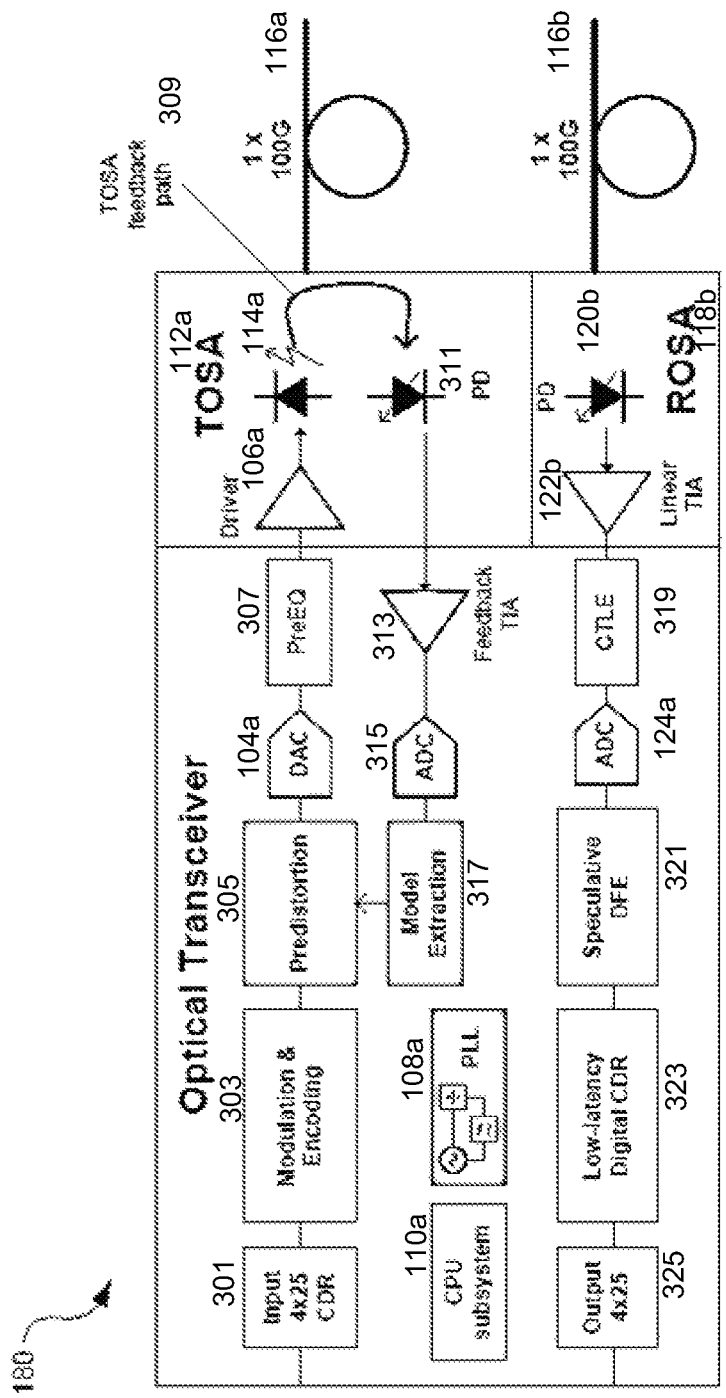
FIG. 1C shows another example closed-loop optical communication system with local transmit optical sub-assembly feedback in accordance with aspects of the disclosure.

FIG. 1C shows another example closed-loop optical communication system with local transmit optical sub-assembly feedback in accordance with aspects of the disclosure. As compared to the system 100 and 150, the system 180 comprises a feedback path 309 directly from the TOSA 112*a* to the transceiver chip so that a feedback path/channel is not required from the opposite end of the optical fibers. The system 180 comprises a TOSA feedback path 309 via a monitor photodiode 311 that monitors the output of the TOSA laser 114*a* and communicates an electrical signal back into the transceiver circuitry, which includes a feedback TIA 313, an ADC 315, a model extraction module 317, and a predistortion module 305.

The optical transceiver circuitry also includes a clock data recovery module 301, a modulation and encoding module 303, a pre-equalizer 307, a continuous tile linear equalizer 319, receiver ADC 124*a*, a speculative digital front end (DFE) 321, a low-latency digital clock data recovery 323, and a receive output demultiplexer 325.

In an example scenario, the monitor photodiode 311 comprises a backside monitor photodiode that monitors a back facet of the laser diode 114*a*. In another example scenario, an optical tap may be utilized to couple a portion of the optical output of the laser diode 114*a* to the monitor photodiode 311. The monitor photodiode 311 may comprise a high-speed, high-bandwidth photodiode, i.e., on the order of the frequency of the optical signal, similar to the ROSA photodiode 120*b*. This is as compared to conventional backside monitor photodiodes that monitor laser output power changes with temperature, for example, which is a slow time-varying parameter. In this manner, the monitor photodiode 311 may directly measure high-frequency impairments from the laser diode 114*a* in the optical signal 116*a* and communicate this signal back to the driver circuitry 106*a*.

The feedback TIA 313 may amplify the received feedback electrical signal and an ADC 315 may convert this signal to a digital signal. The digitized signal may be input to the model extraction module 317 that may model the received signal and compare it to the desired digital signal. An output based on this comparison may be utilized by the predistortion module 305 to apply a predistortion signal to the signal communicated to the DAC 104*a* and pre-equalizer 301. The predistortion may compensate for the impairments and non-linearities from the laser diode 114*a* thereby increasing output power and bandwidth into the optical fiber 116*a*.

Since the feedback is local, i.e., at one end of the optical link, this impairment/distortion suppression is independent of the type of modulation, whether it be OFDM, PAM 4, or NRZ, for example. In addition, this also means that out-of-band signaling is not needed to provide feedback from one end of the optical link to the other.

Furthermore, since the monitor photodiode 311 is a high-frequency, high-bandwidth, i.e., on the order of the TOSA laser 114*a* and ROSA photodiode 120*b* (e.g., 25, 50, 100 GHz or higher), the suppression of high-frequency impairments and distortions is enabled. Furthermore, the monitoring may be continuous to change the predistortion as the distortion or non-linearity in the laser changes, or may be intermittent with a lower duty cycle, if the distortion or non-linearity is not constantly changing or stays within an acceptable level between monitoring periods, thereby reducing power usage.

Figure 2:
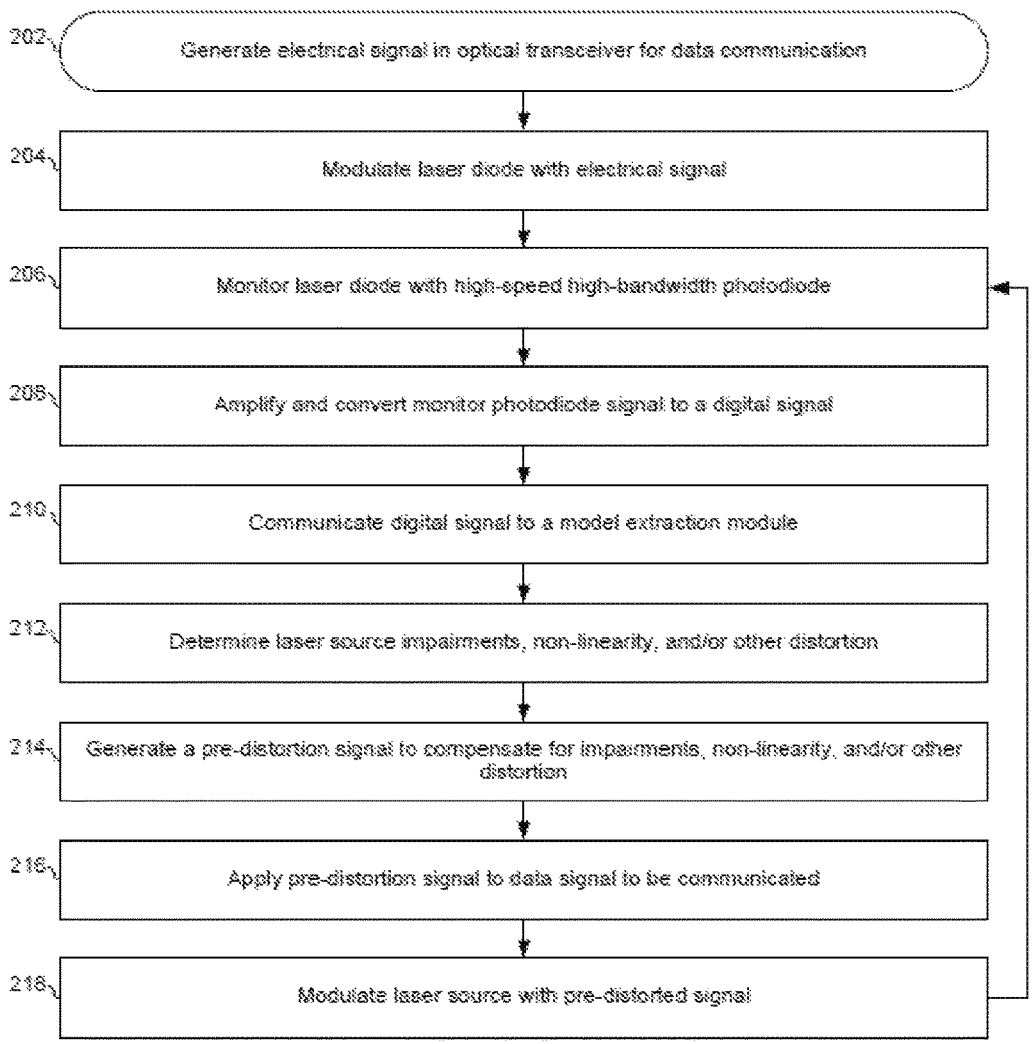
FIG. 2 is a flowchart illustrating operation of a closed-loop optical communication system with a local transmit optical sub-assembly feedback in accordance with aspects of this disclosure.

FIG. 2 is a flowchart illustrating the operation of a closed-loop optical communication system with a local transmit optical sub-assembly feedback in accordance with aspects of this disclosure. In block 202, a first electrical signal is generated in the optical transceiver for data communication. In block 204, the laser diode may be modulated with the data signal.

In block 206, the optical signal generated by the laser diode may be monitored by a high-speed, high-bandwidth photodiode. In block 208, the output of the monitor photodiode may be amplified and converted to a digital signal. In block 210, the digital signal may be communicated to a model extraction module.

In block 212, impairments, non-linearity, and/or other distortion may be determined by comparing the signal from the feedback path to the desired data signal in the model extraction module. In block 214, the determined impairments, non-linearity, and/or other distortion may be utilized to generate a pre-distortion signal. In block 216, the pre-distortion signal may be applied to the desired data signal to be communicated.

In block 218, the data plus predistortion signal may be utilized to modulate the laser diode for communication via the optical fiber, and the process may repeat on a constant basis or periodic basis, repeating the process from block 206 where the laser diode is monitored.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

The present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set { (x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system for optical communications, comprising:
a predistortion module operable to modify an input digital signal to produce a digital predistorted signal;
a transmit optical subsystem operable to generate an optical signal from the digital predistorted signal; and
a feedback subsystem operable to determine one or more characteristics of the optical signal, the feedback subsystem controlling the modification applied to the input digital signal by the predistortion module according to the one or more characteristics of the optical signal and a current temperature of the transmit optical subsystem, wherein the one or more characteristics of the optical signal comprise a temperature that is determined according to a plurality of Volterra series coefficients and a comparison between the optical signal and an expected signal.

2. The system of claim 1, wherein the one or more characteristics of the optical signal comprise a nonlinear relationship between the digital predistorted signal and the optical signal.

3. The system of claim 1, wherein the feedback subsystem is operable to determine the modification of the input digital signal that linearizes a model of the transmit optical subsystem.

4. The system of claim 1, wherein the one or more characteristics of the optical signal comprise a temperature dependency.

5. The system of claim 1, wherein the feedback subsystem comprises a backside monitor photodiode.

6. The system of claim 1, wherein the transmit optical subsystem comprises a pre-equalizer circuit and a photodiode.

7. The system of claim 1, wherein the feedback subsystem comprises a high-speed, high-bandwidth photodiode.

8. The system of claim 7, wherein the high-speed, high-bandwidth photodiode intermittently monitors the optical signal.

9. A method for optical communications, wherein the method comprises:
modifying an input digital signal to produce a digital predistorted signal;
generating, via a transmit optical subsystem, an optical signal from the digital predistorted signal;
determining one or more characteristics of the optical signal; and
controlling the modification applied to the input digital signal according to the one or more characteristics of the optical signal and a current temperature of the transmit optical subsystem, wherein the one or more characteristics of the optical signal comprise a temperature that is determined according to a plurality of Volterra series coefficients and a comparison between the optical signal and an expected signal.

10. The method of claim 9, wherein the method comprises determining whether the relationship between the digital predistorted signal and the optical signal is nonlinear.

11. The method of claim 9, wherein the method comprises determining the current temperature according to a predetermined behavior of the optical signal.

12. The method of claim 9, wherein determining one or more characteristics of the optical signal comprises intermittently monitoring the optical signal using a high-speed, high-bandwidth photodiode.

13. The method of claim 9, wherein determining one or more characteristics of the optical signal comprises modelling the generation of the optical signal.

14. The method of claim 9, wherein determining one or more characteristics of the optical signal comprises determine the modification of the input digital signal that linearizes a model of the optical signal generation.

15. A non-transitory machine-readable storage having stored thereon, a computer program having at least one code section for enabling optical communications, the at least one code section being executable by a machine for causing the machine to perform operations comprising:
modifying an input digital signal to produce a digital predistorted signal, the digital predistorted signal being used by a transmit optical subsystem for generating an optical signal;
determining one or more characteristics of the optical signal; and
controlling the modification applied to the input digital signal according to the one or more characteristics of the optical signal and a current temperature of the transmit optical subsystem, wherein the one or more characteristics of the optical signal comprise a temperature that is determined according to a plurality of Volterra series coefficients and a comparison between the optical signal and an expected signal.

16. The non-transitory machine-readable storage of claim 15, wherein the at least one code section is executable to perform the operation of determining whether the relationship between the analog current signal and the optical signal is nonlinear.

17. The non-transitory machine-readable storage of claim 16, wherein the at least one code section is executable to perform the operation of determining the current temperature according to a predetermined behavior of the optical signal.

18. The non-transitory machine-readable storage of claim 15, wherein the at least one code section is executable to intermittently monitoring the optical signal according to the output of a high-speed, high-bandwidth photodiode.

19. The non-transitory machine-readable storage of claim 15, wherein the at least one code section is executable to determine the modification of the input digital signal that linearizes a model of the optical signal generation.

* * * * *